United States Patent [19]
Vandamme et al.

[11] Patent Number: 5,665,479
[45] Date of Patent: Sep. 9, 1997

[54] SINTERED MULTILAYER METAL FIBER WEB

[75] Inventors: Johan Vandamme, Deinze; Jan Loncke, Zwevegem, both of Belgium

[73] Assignee: N.V. Bekaert S.A., Belgium

[21] Appl. No.: 570,895

[22] Filed: Dec. 12, 1995

[51] Int. Cl.[6] .................................................. B32B 5/18
[52] U.S. Cl. ...................... 428/613; 210/500.25; 428/608
[58] Field of Search .................................. 428/212, 219, 428/285, 256, 297, 298, 282, 608, 615, 613; 210/500.25

[56] References Cited

U.S. PATENT DOCUMENTS 2,050,298  8/1936  Everett.
3,469,297  9/1969  Webber ................................ 29/180
3,505,038  4/1970  Luksch et al. ...................... 29/183.5

*Primary Examiner*—James J. Bell
*Attorney, Agent, or Firm*—Nixon & Vanderhye PC

[57] ABSTRACT

A pressure resistant sintered non-woven multilayer metal fiber web is particularly useful for high pressure filtration applications (e.g., polymer filtration). The web has a porosity of between 50% and 74%, a weight of between 750 and 1600 g/m$^2$, and a fiber diameter in each successive layer of between 1.2 to 2 times less than the fiber diameter in the previous layer. The web may be covered with an outer permeable layer at one, or both, of its planar sides.

6 Claims, 1 Drawing Sheet

SINTERED MULTILAYER METAL FIBER WEB

BACKGROUND OF THE INVENTION

The invention relates to a sintered multilayer metal fiber web, in particular for use in filtration at a high pressure such as in polymer filtration. In the field of melt spinning of synthetic filaments the molten polymer is pressed through a spinpack filter where hydraulic pressures can vary between 150 and 250 bar.

Presently sintered multilayer metal fiber webs are in use as filters with a porosity of about 80% and a high dirt holding capacity (DHC). When used e.g. as a final filter in spinpacks these highly porous structures tend to densify during use under the high hydraulic pressures which are applied. This densification may alter the filtration characteristics during the lifetime of the filter which is a disadvantage.

SUMMARY OF THE INVENTION

It is thus an object of the invention to avoid this disadvantage and to provide a robust and pressure resistant sintered multilayer metal fiber web.

In particular it is an object of the invention to provide such a pressure resistant sintered web structure which, during an increased total and increased real on stream lifetime of its use, substantially retains the filtration characteristics for which it is designed, in particular its porosity and its dirt holding capacity.

The pressure resistant multilayer sintered web structure according to the invention which meets the above requirements should have a porosity of between 50% and 74% and its weight is chosen between 750 g/m² and 1600 g/m² and preferably at at least 900 g/m². Sintered web structures with a lower porosity than 50% risk to clog too rapidly with the consequence of requiring too many cleaning cycles during their lifetime. Sintered web structures with a porosity above 74% cannot sustain the high filtration pressures without risking to undesirably densify during use. A weight of less than 750 g/m² is insufficient to produce filters with the required mechanical strength to resist substantial variations in filter pressure and to sustain numerous recleaning cycles. On the other hand, rising the weight above 1600 g/m² would not sufficiently raise the filtration performance in relation to the cost of the filter.

To achieve and retain the proper dirt holding capacity (DHC) of the filter, it has further been found that the fiber diameter in each next layer should preferably be between 1,2 and 2 times less than the fiber diameter in the previous layer. The direction of the flow through the filter of the material to be filtered is thereby understood to cross first a previous layer and then a next layer. This means that the material to be filtered first crosses the layer with the thickest fibers and finally the layer with the thinnest fibers.

The multilayer sintered fiber web structure can be covered at its planar inlet and/or at its outlet side with a protective foraminous or permeable layer, e.g. a fine woven wire mesh fabric or a sintered web of coarse metal fibers. These outer layers are preferably sintered to the multilayer web structure.

The multilayer structure comprises preferably at least three web layers and not more than five layers, whereby the fiber diameter differs from one layer to the other as described above.

Although the DHC of the multilayer structure can range between wide limits from 5 to 30 mg/cm², a range between 5 and 20 and even between 5 and 15 mg/cm² will be preferred. The DHC is thereby determined according to the Multipass method ISO 4572. The differential pressure applied thereby is about 8 times the initial differential pressure.

Besides the advantages mentioned above the filters according to the invention have an improved pleatability and weldability which makes them more suitable for transformation into pleated cartridges. Further, in an overflow BPP test they produce a more homogeneous bubbling performance.

DETAILED DESCRIPTION OF CERTAIN EMBODIMENTS Examples

Figure 1:
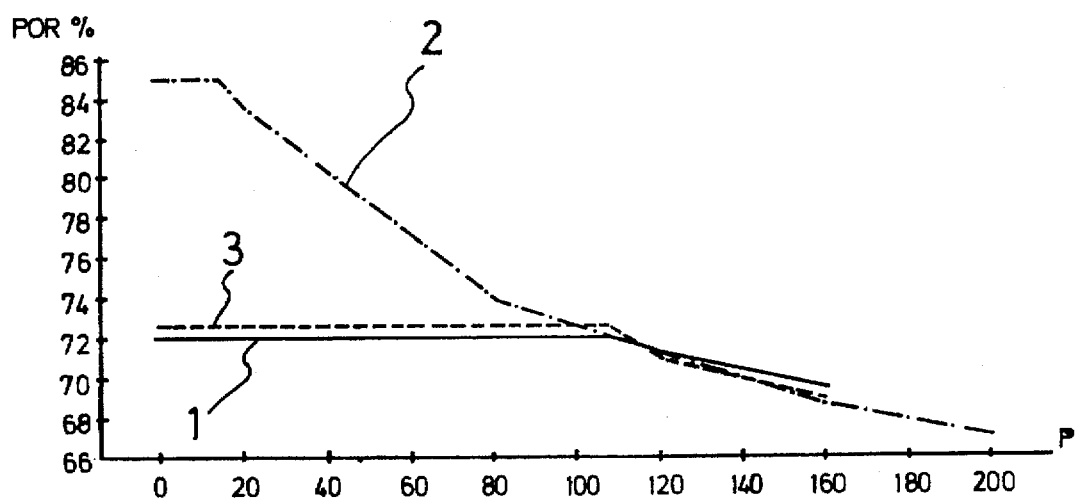
FIG. 1 shows the change in porosity of certain sintered web structures with increasing pressure of the filter.

The sintered metal fiber web structure according to the invention comprises a number of non woven webs stacked onto each other. The metal fibers are mostly stainless steel fibers. The sintered webs are generally known and sold by applicant under its trademark Bekipor®. The fibers in the webs are produces by a process of bundle drawing similar to the methods disclosed e.g. in U.S. Pat. No. 2,050,298. They have generally a somewhat roughened surface. The equivalent fiber diameter can be chosed between 1 µm and 30 µm. A method of producing the webs, respectively for combining them with wire screens and for sintering and transforming them to filters is disclosed in U.S. Pat. No. 3,469,297, respectively in U.S. Pat. No. 3,505,038.

In an examplary embodiment a spinpack filter was designed as follows. The filterrating ("a" in µm) was choosen at 5 µm. Three non woven stainless steel fiber webs of about equal weight were stacked onto each other. The fiber alloy was 316 L, although e.g. Inconel 601, Hastelloy X, Hastelloy R or Fecralloy can be used as well. The web stack layer had a total weight of 900 g/m² and was sandwiched between fine wire meshes (mesh 40). This multilayer structure was then sintered under pressure to form a filter with a porosity of 72% and a thickness of 0,4 mm. The DHC remained constant at about 6,8 mg/cm² with increasing hydraulic pressure as used in conventional polymer filtration practice. In the web layer at the inlet side of the filter the equvalent fiber diameter was chosed at 8 µm. The fiber diameter in the core layer was 4 µm and in the exit side of the filter the diameter was set at 2 µm. The fiber diameter ratio from each next web layer to the previous layer was thus set at 2 for this filter design: 8/4=4/2=2.

A similar filter structure was designed with a filter rating a=15 µm. Again three layers with equal weight were stacked to a multilayer structure with a weight of 900 g/m² and sandwiched between fine wire meshes as described before. After sintering the porosity was 72% and the thickness 0,4 mm. The DHC was 10.9 mg/cm². In the web layer at the inlet side of the filter the fiber diameter was 22 µm. The fiber diameter in the core layer was 12 µm and in the exit side 8 µm.

A third similar filter structure with a filter rating of a=25 µm had a weight of 1050 g/m² and 3 layers. The DHC was 18,25 mg/cm² and the prosity 72,5%. The fiber diameter at the inlet side was 30 µm and decreased in the next layer to 22 µm and had an exit layer with 12 µm fibers.

In FIG. 1 the decrease of porosity (%) (densification) with increasing pressure (P in bars) was registered for some sintered web filter structures comprising stainless steel fibers. The structures were mechanically compressed. The mechanical pressure values applied simulate the real hydraulic pressures exerted by filtration of the viscous polymer in real use of the filter. The hydraulic pressure with correlates in compressing effect on the filter to a certain mechanical test pressure is of course substantially higher than said test pressure. It can generally be said that, depending on the viscosity of the polymer to be filtered, a mechanical test pressure of 120 to 150 bar will correlate with a usual hydraulic pressure of about 180 to about 300 bar in spinpacks.

The line 1 relates to a multilayer filter structure according to the invention as described above with the filter rating of a=15 μm. The long horizontal section in line 1 indicates its resistance to pressure over a broad range up to about 100 bar mechanical test pressure.

Line 2 relates to a filter structure with the same layer composition and filterrating (a=15 μm) as mentioned above. However the porosity was 85% and the thickness 0,75 mm. It shows a great drop in porosity, i.e. a substantial densification during compression. The filtering characteristics thus change considerably with pressure.

Figure 2:
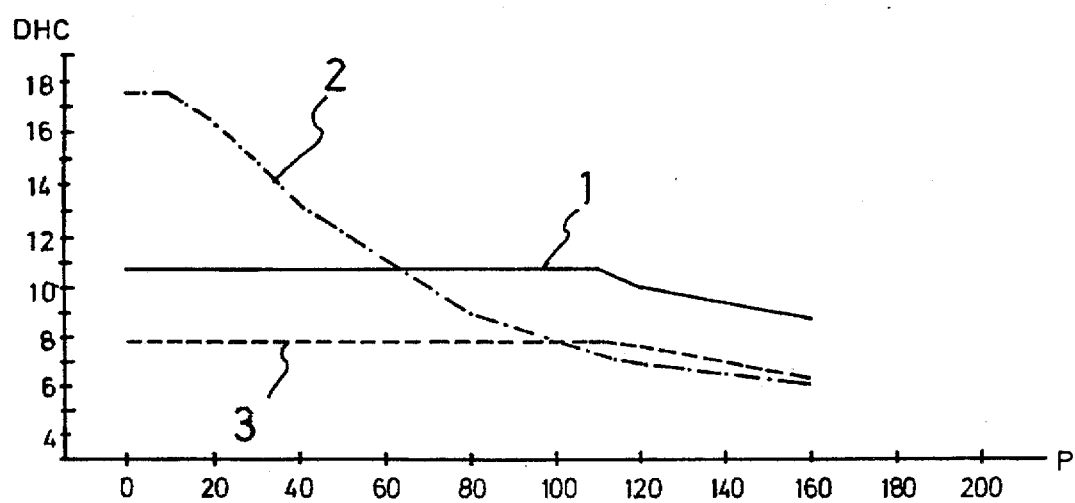
FIG. 2 indicates the change in dirt holding capacity for the same filter structures with increasing pressure on the filter.

Line 3 relates to a filter structure comprising two web layers and with the same filter rating of a=15 μm. The fiber diameter in the structure is 8 μm at the exit layer and 12 μm at the inlet layer. The thickness of this structure is 0,34 mm. Its porosity is set at 72.6% and its weight at 750 g/m². FIG. 1 shows that its resistance to increasing pressure is comparable to that of the three layer structure according to the invention. However, when looking at the DHC-values, as shown in FIG. 2 it is surprising to see that it is substantially lower (line 3) than for the three layer structure (line 1). Indeed the DHC drops from about 10.9 mg/cm² for the three layer structure to about 7.9 mg/cm² for the two layer structure. This drop in DHC is responsible, for example, for a reduced on stream lifetime of the filter.

For certain filterratings it is difficult to combine readily avaiable fiber diameters to meet the desired fiber diameter ratios between the different layers. In such cases it is possible to blend fibers with different diameters in the same sublayer. For a filter with a rating of 10 μm e.g., the exit layer can be composed of a blend of fibers with a diameter of 4 μm and fibers with a diameter of 6.5 μm.

We claim:

1. A pressure resistant sintered non-woven multilayer metal fiber web having a porosity of between 50% and 74%, a weight of between 750 and 1600 g/m² and wherein the fiber diameter in each succesive layer is between 1.2 to 2 times less than the fiber diameter in the previous layer.

2. A sintered web according to claim 1, characterized in that it is covered with an outer permeable layer at one or both of its planar sides.

3. A sintered web according to claim 1 comprising at least three fiber web layers.

4. A sintered web according to claim 1 having a weight of at least 900 g/m².

5. A filter, comprising a multilayer metal fiber web according to claim 1 having a dirt holding capacity (DHC) of between 5 and 20 mg/cm².

6. A filter according to claim 5 having a DHC of at most 15 mg/cm².

* * * * *